United States Patent [19]

Veronesi et al.

[11] Patent Number: 4,681,728
[45] Date of Patent: Jul. 21, 1987

[54] NUCLEAR REACTOR

[75] Inventors: Luciano Veronesi, O'Hara Township, Allegheny County, Pa.; Franklin D. Obermeyer, Pensacola, Fla.; James R. Chrise, Trafford, Pa.

[73] Assignee: Westinghouse Electric Corp., Pittsburgh, Pa.

[21] Appl. No.: 715,125

[22] Filed: Mar. 22, 1985

[51] Int. Cl.$^4$ .......................... G21C 7/10; G21C 7/12
[52] U.S. Cl. .................................. 376/209; 376/352; 376/353; 376/399
[58] Field of Search ............... 376/353, 352, 399, 209; 220/19, 20; 211/41

[56] References Cited

U.S. PATENT DOCUMENTS

| | | | |
|---|---|---|---|
| 2,620,928 | 12/1952 | Brooks | 211/41 |
| 2,774,472 | 12/1956 | Badalich | 211/41 |
| 3,012,957 | 12/1961 | Spooner | 376/353 |
| 3,734,825 | 5/1973 | Schabert et al. | 376/353 |
| 3,929,565 | 12/1975 | Fredin et al. | 376/353 |
| 3,940,311 | 2/1976 | Frisch et al. | 376/353 |
| 3,954,560 | 5/1976 | Delafosse et al. | 376/353 |
| 4,092,216 | 5/1978 | Aubert | 376/353 |
| 4,231,843 | 11/1980 | Myron et al. | 376/353 |
| 4,534,933 | 8/1985 | Gjertsen et al. | 376/364 |

Primary Examiner—Frederick R. Schmidt
Assistant Examiner—William E. Terrell
Attorney, Agent, or Firm—D. C. Abeles

[57] ABSTRACT

A nuclear reactor including, in the upper internals, a guide structure capable of effectively accommodating and guiding without binding the large number of neutron-absorber rods included in modern reactors of improved efficiency. The neutron-absorber rods include control rods, gray rods, and water-displacement rods. All rods are suspended in clusters from spiders or vanes. The upper internals of the reactor includes cruciform guides for the control-rod and gray-rod clusters. Each of these guides is composed of a plurality of vertical guide sections of transverse cruciform cross section. Plates extending throughout the cross-section of the reactor are supported between each pair of successive guide sections. The plates are perforated, the perforations in each plate being patterned to pass the water-displacement rod clusters. The plates are oriented so that the patterned perforations are aligned to serve as guides for the water-displacement rod clusters. The plates are of very large diameter and, as perforated, would not be self-supporting unless they were very thick. To overcome this drawback, each plate is formed of separate plate sections which are, when assembled nested together, like the parts of a "jig-saw puzzle".

14 Claims, 21 Drawing Figures

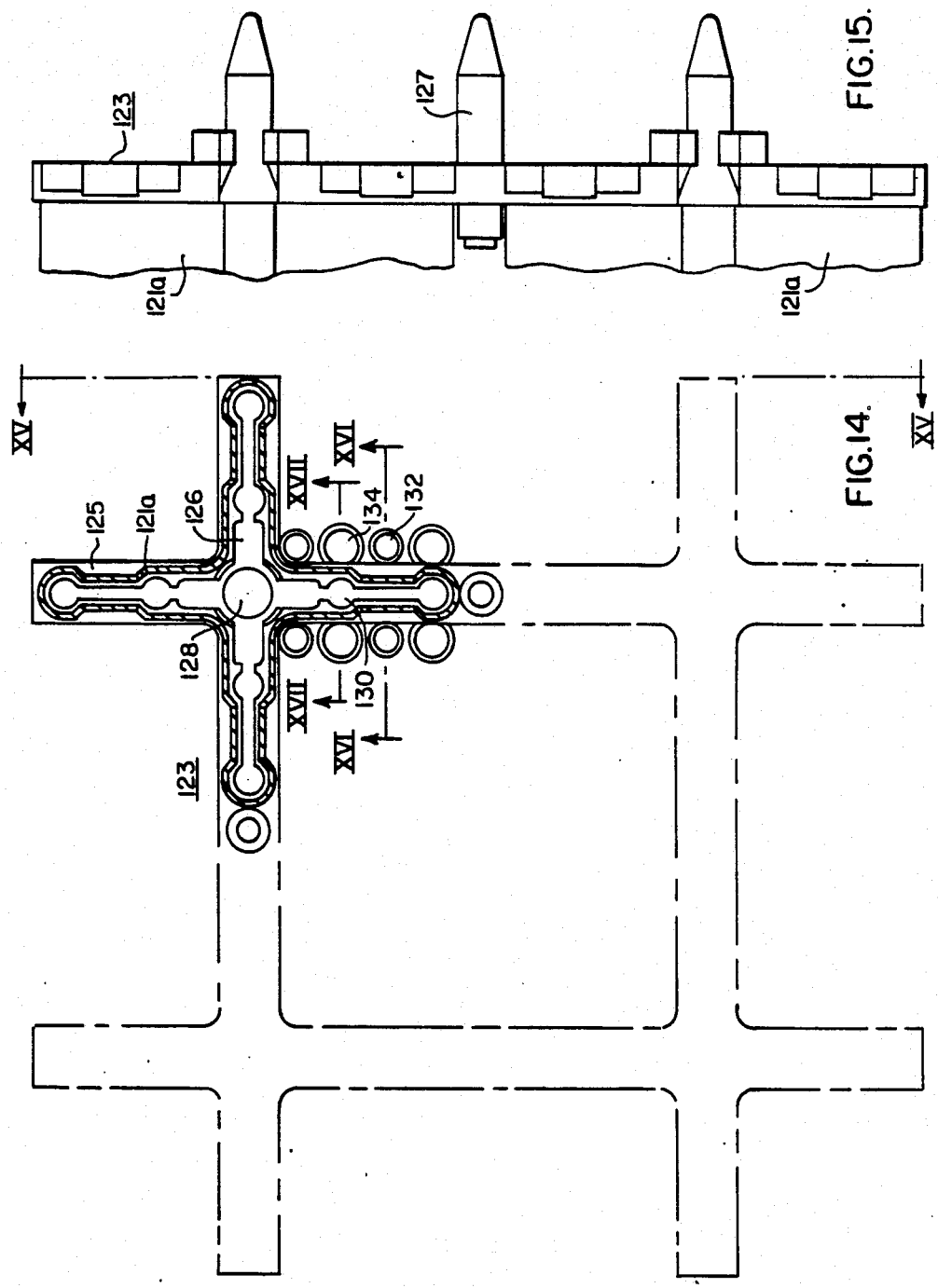

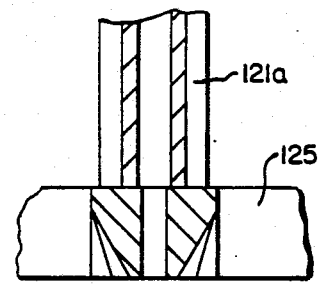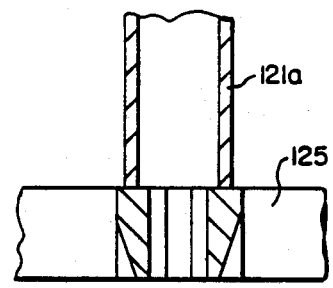
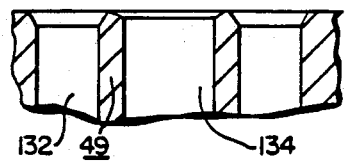
FIG.16.
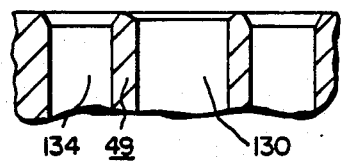
FIG.17.
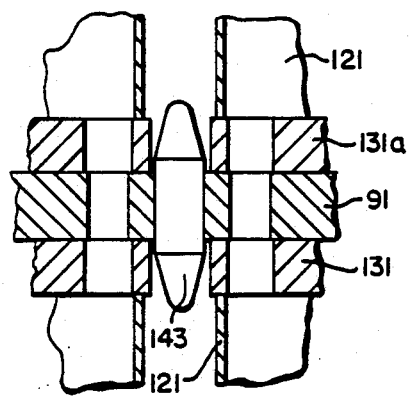
FIG.20.
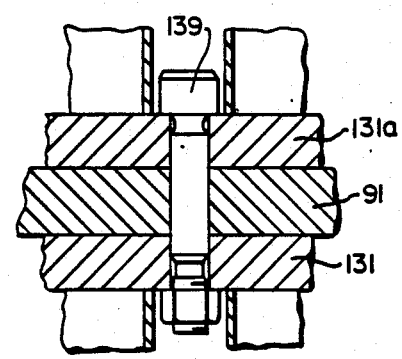
FIG.21.

NUCLEAR REACTOR

CROSS-REFERENCE TO RELATED APPLICATIONS

Application Ser. No. 490,099 filed Apr. 29, 1983 to Luciano Veronesi et al. for *Nuclear Reactor* (herein Veronesi) pending and assigned to Westinghouse Electric Corporation is incorporated herein by reference. The reactor disclosed by Veronesi is sometimes referred to in the art as the Mechanical Moderator Controlled Reactor (MMCR).

Application Ser. No. 490,097 filed Apr. 29, 1983 to Luciano Veronesi for *Nuclear Reactor* (herein Veronesi '097) pending and assigned to Westinghouse Electric Corporation is also incorporated herein by reference.

BACKGROUND OF THE INVENTION

This invention relates to nuclear reactors and has particular relationship to reactors having a large number of different rods moveable in and out of the core to control the neutron flux. In its specific aspects, this invention concerns itself with reactors of the type in which a flow-through screen and disclosed in Veronesi '097 encircles the neutron-absorption rod guides. The flow-through screen has the effect of reducing the radial velocity of the coolant as it flows through the upper internals. The Mechanical Moderator Controlled Reactor disclosed by Veronesi is such a reactor. It this reactor there are control rods, gray rods and water-displacement rods for adjusting the neutron flux. The rods are suspended from spiders in clusters which are moveable by drives to achieve the desired or required neutron flux. The control rods are substantially neutron absorbent and serve for load-follow operations and must be capable of deactivating the reactor during refueling and quickly and effectively during scram. The gray rods have substantially lower neutron-absorbent capability than the control rods and also serve for load follow. They are moveable in and out of the core to "fine tune" the neutron flux. The water-displacement rods are inserted in the core during the earlier part, typically 40%, of the fuel cycle and are removed from the core during the remainder of the fuel cycle. The water-displacement rods when inserted in the core reduce the low energy neutron flux during the early part of the fuel cycle when the flux is high by reducing the moderation by the water coolant. When the water displacement rods are removed from the core, their function of reducing low energy neutron flux is substantially reduced. Each control-rod and gray rod cluster is associated with a fuel assembly and is moveable by its drive in or out of the fuel assembly or relative to a fuel assembly. Each displacement-rod cluster is associated with a plurality of fuel assemblies. Typically, there are in a Mechanical Moderator Controlled Reactor eighty-eight control-rod clusters and gray-rod clusters. Each cluster is of cruciform shape and carries eight rods positioned along the axial member and cross member of the cruciform. Typically, there are ninety-seven water-displacement rod clusters (WDRC's). Each WDRC in a typical MMCR, except those along the periphery of the upper internals, carries forty rods. Those along the periphery carry fewer than forty rods. The water-displacement rods are carried by a plurality of radial arms in the form of crucifixes extending from a central sleeve. The control-rod clusters in their functioning for load follow, experience frequent and rapid movement relative to their associated fuel assemblies. The gray-rod clusters typically may be inserted or fully withdrawn from their associated fuel elements 5600 times during the life of an MMCR. Each WDRC is fully inserted in a number of fuel assemblies symmetrical about its axis during the earlier part of the fuel cycle, and is fully withdrawn from the fuel assemblies and held in the withdrawn position during the remainder, typically 60%, of the fuel cycle.

For reliable operation of a nuclear reactor, it is necessary that the neutron-flux adjusting rod clusters be effectively guided as they move in and out of the core. It is indispensable that the clusters be moveable without binding or sticking. It is an object of this invention to provide a nuclear reactor of the type having a large number of neutron-flux adjusting rods, such as the MMCR, including guides for the neutron-absorption rods which shall effectively guide these rods as they move in and out of the core and in whose use the rods shall not bind or stick as they are moved. It is another object of this invention to provide a nuclear reactor of the type that includes a flow-through screen about the guide structure having such guides for the neutron-flux adjusting rods.

SUMMARY OF THE INVENTION

This invention is applicable to, and can be embodied in, nuclear reactors of all types, those which have a flow-through screen and those which do not have such a screen. The invention, however, has unique applicability to nuclear reactors which have a flow-through screen. In prior art reactors each control rod, when it is retracted, is protected, by a housing, which forms a part of the guide structure, from the forces exerted by the cross-flow or radial flow of the coolant. This invention arises from the realization that in reactors including a flow-through screen, the water-displacement rods, when retracted into the upper internals, can, at least to an extent, be exposed to the coolant because in such reactors the radial velocity of the coolant is low and the drag forces exerted by the coolant on the exposed rods would be low. An additional factor which leads to the conclusion that exposure of the retracted water-displacement rods is feasible is that the time of exposure of these rods is substantially less than the time for control rods or gray rods.

In accordance with this invention there is provided a nuclear reactor whose upper internals include a plurality of generally vertical guides. Each guide is formed of a plurality of vertically coextensive guide sections; each section is best described as a can open at the ends. Each can is formed and dimensioned so as to accommodate the neutron-absorber-rod clusters. Specifically, each can may have a cruciform transverse cross-section so as to pass and guide the control-rod and gray rod clusters. A generally horizontal plate is supported on the tops of each array of guide sections which are at the same level. There are thus a plurality of generally horizontal plates in a vertical array. The plates are perforated, the perforations in each plate being shaped and coordinated so as to pass the others of the neutron-flux adjusting rods. Specifically, the perforations in each plate extend radially from a central opening and include cruciform radial slots so as to pass the WDRC's. The plates are oriented in the vertical array with corresponding perforations precisely aligned so that the plates serve as guides for the WDRC's. Typically, in an MMCR, the plates have a diameter of about one hundred seventy-five inches and are composed of stainless steel. Because the plates are perforated as described, they would not, if they were integral structures, be self-supporting so that they could be manipulated unless they were very thick. To facilitate manipulation of the structure during assembly or disassembly of the reactor, each plate is formed of separate plate sections which can be nested in the manner of a "jig-saw puzzle" during assembly. Each plate section is supported on one or a plurality of the vertical guide sections.

The water-displacement rods are partially exposed to the cross-flow of the coolant. When the plate sections are nested to form a plate, each plate may be regarded as divided into areas defined by a plurality of cans. The columnar volume under each plate-section area, except those around the periphery of a plate, is bounded to a substantial extent by arms on the cruciforms configuration of the cans. The areas around the periphery of each plate sections are partly bounded by the arms of cans. The water-displacement rods, when retracted, are partially protected by the arms of the surrounding cans from the cross-flow of the coolant. In the case of reactors with flow-through screens, as disclosed in Veronesi '097, the radial velocity of the coolant is low and the water-displacement rods are subjected to relatively low cross-flow forces. The plates formed of the assembled plate sections serve as plate guides for the WDRC's The reduction of velocity achieved with the flow-through screen is particularly important in reactors including WDRC's. There are a large number of water displacement rods, typically forty in each cluster. These rods together with the guides for the control rods and gray rods occupy a substantial portion of the volume of the upper internals. The coolant is driven by powerful pumps and is sucked out of the outlet nozzles at a high velocity, typically 50 feet per second. In the absence of the flow-through screen, the coolant would flow to the outlet nozzles predominantly through the portion of volume of the upper internals which is defined by an imaginary cylinder having the transverse cross-sectional areas of the openings in these nozzles and through the region immediately adjacent these cylinders. The coolant would wash the parts of the control rod and gray-rod guides and the water-displacement rods in this volume. Because the parts of the guides and water displacement rods occupy a large portion of this volume, the coolant velocity in this region of the guides and the water-displacement rods would be very high and the guides and rods would be subjected to high stresses resulting in failures. The flow-through screen distributes the coolant over the whole volume of the upper internals, reducing the flow velocity. Typically the flow velocity is reduced to about 4 ft/sec. Failure of the guides and water-displacement rods is thus precluded.

In assembling the reactor, each plate section is assembled into an integrated unit, external to the reactor vessel, with its associated guide section or sections. The guide sections of each plate section are welded to end plates. The guide sections and end plates of the plate section are then stacked and secured to form an integrated columnar unit with the like plate sections interposed between adjacent end plates. The guide sections which extend along the unit are each bolted between end plates properly oriented so that the perforations of these sections are precisely aligned. Each column includes a number of complete guides equal to the number of guide sections which support the corresponding plate sections. Once all of the plate sections are assembled in columns, they are positioned in the pressure vessel on the upper core support with the plate sections at each level nested to complete the array of plates in the manner of a "jig-saw puzzle". The integrated units are pinned to the upper core support properly laterally aligned. Before these integrated units are inserted, the flow-through screen had been inserted in the pressure vessel. The integrated units are centered within the flow-through screen. The neutron-flux adjusting rod clusters are then inserted in the guide structures with their drive rods extending above the upper-internals. The upper-internals top plate is then positioned on top of the assembly of integrated units.

BRIEF DESCRIPTION OF THE DRAWINGS

For a better understanding of this invention, both as to its organization and as to its method of operation, together with additional objects and advantages thereof, reference is made to the following description, taken in connection with the accompanying drawings, in which:

FIG. 14 is a plan view enlarged of the lower plate of the unit shown in FIG. 11 as seen from above this lower end plate;

FIG. 15 is a fragmental view in side elevation taken in the direction XV—XV of FIG. 14;

FIG. 16 is a fragmental view in section taken along line XVI—XVI of FIG. 14;

FIG. 17 is a fragmental view in section taken along line XVII—XVII of FIG. 14;

FIG. 20 is a fragmental view in section taken along line XX—XX of FIG. 19 with the associated WDRC not present; and FIG. 21 is a fragmental view in section taken along line XXI—XXI of FIG. 19 with the associated WDRC not present.

DESCRIPTION OF THE PREFERRED EMBODIMENT

Figure 1:
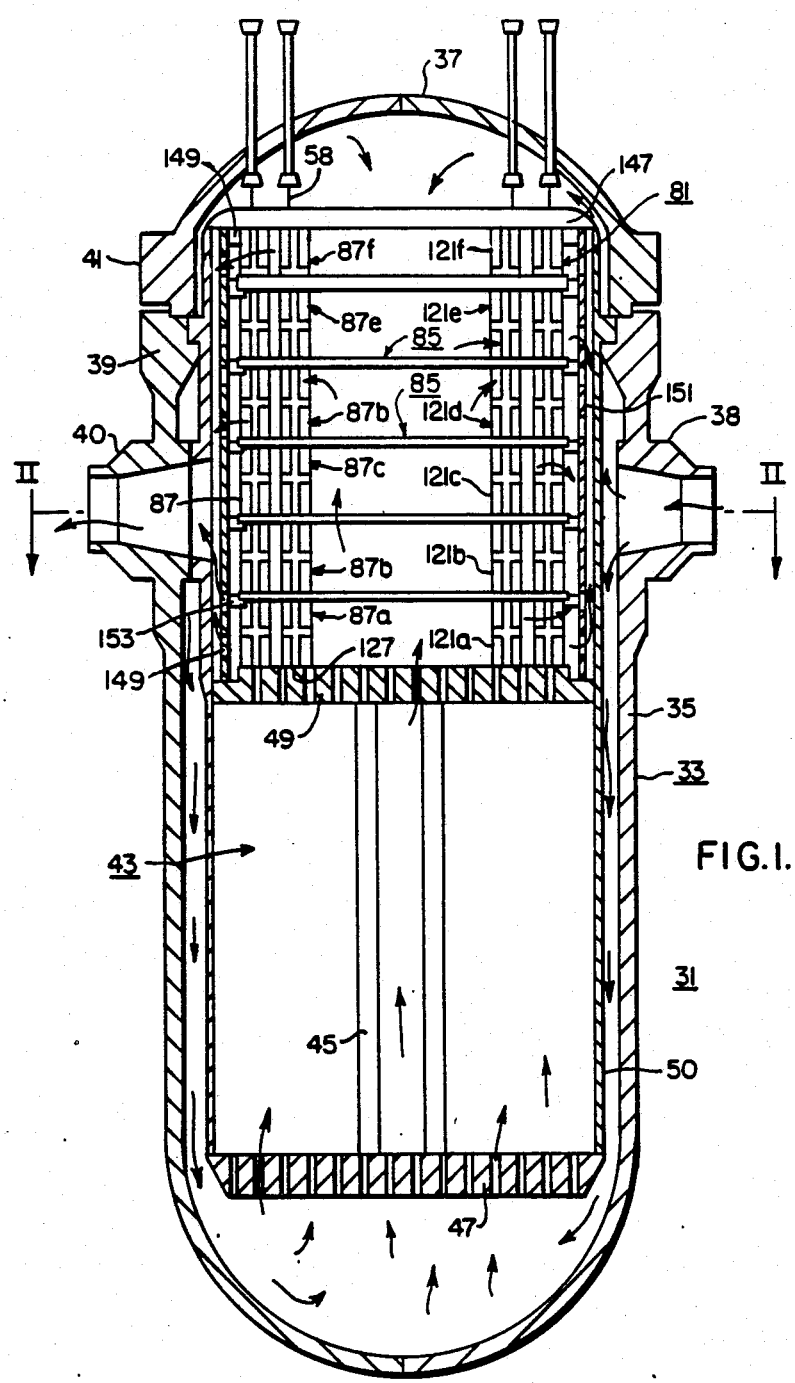
FIG. 1 is a view in longitudinal section taken along lines I—I of FIG. 2 of a reactor in accordance with the invention.

The apparatus shown in the drawings is a nuclear reactor 31 such as the Mechanical Moderator Controlled Reactor. This reactor includes a pressure vessel 33 consisting of a circular cylindrical body 35 having a spherical bottom and a dome-shaped top 37. The body has a plurality of inlet nozzles 38 and outlet nozzles 40. The body and the top have flanges 39 and 41 which, when the reactor is in use, are engaged and sealed. The reactor has a nuclear core 43 including a plurality of fuel assemblies 45. The fuel assemblies 45 are mounted between a lower core-support plate 47 and an upper core-support plate 49 in the lower part of the pressure vessel 33. The core 43 is encircled by a core barrel 50 which is mounted on flange 39 at the upper end and is secured to the lower core-support plate 47 at the lower end.

Clusters 51 of control rods and gray rods 53 (FIGS. 2, 3, 19) and clusters 55 of water-displacement rods 57 (FIGS. 4, 19) are moveable in and out of the fuel assemblies 45 by drive rods 58 (FIG. 1) which are actuable by a control (not shown) external to the reactor. Each cluster 51 typically carries eight control rods or gray rods. Each cluster 55 typically carries forty water-displacement rods. Each cluster 51 of control rods or gray rods 53 is associated with a corresponding fuel assembly 45 and, when actuated by its associated drive rod, its control rods are moved in or out of the corresponding assembly. Each WDRC 55 is associated with a plurality of fuel assemblies positioned peripherally with respect to the axis of the cluster and symmetrical with respect to the axis except at the periphery of the reactor. When the WDRC is actuated by its drive rod, the water-displacement rods which it carries are moved in or out of these assemblies 45.

Figure 2:
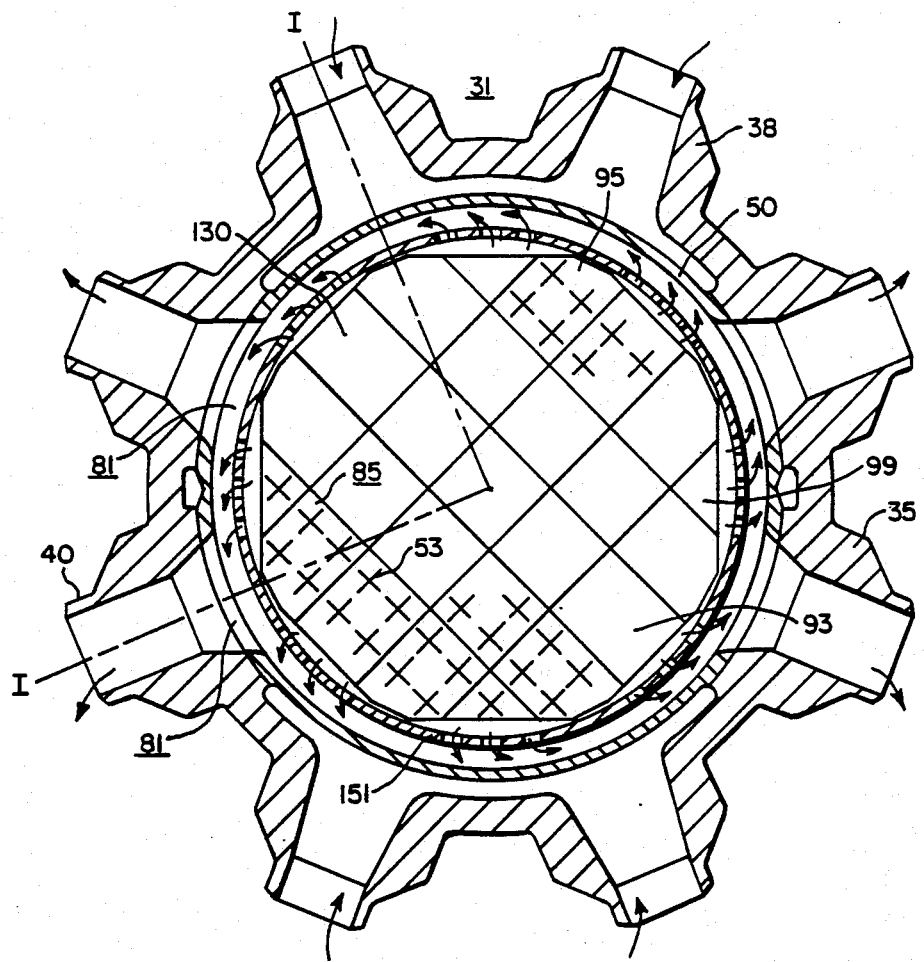
FIG. 2 is a view in transverse section taken along lines II—II of FIG. 1.

Each control-rod or gray-rod cluster 51 is of cruciform shape. It includes a central sleeve 61 (FIGS. 3, 19) from whose periphery vanes 63 spaced at 90° from each other, to define quadrants between them, extend. A control rod or gray rod 53 is suspended from the end of each vane 63 and a control rod or gray rod is suspended from a position intermediate the end of the vane and the sleeve 61. Typically, the distance between the center of each rod suspended from the end of a vane 63 and the center of the intermediate rod 53 on the same vane is equal to the distance between the center of this intermediate rod and the axis of the sleeve 61. The sleeve 61 is connected to a drive rod 58 (FIG. 1).

The water-displacement-rod cluster 55 (FIGS. 4, 19) includes a central sleeve 71 connected to a drive rod 58. Vanes 73 and 75 radiate from the outer surface of the sleeve 71. The vanes 73 and also the vanes 75 are, respectively, spaced angularly by 90°, each pair of consecutive vanes 73 defining a quadrant which is bisected by a vane 75. Each vane 73 and 75 terminates in a crucifix having a cross member 77 and 79, respectively. Typically, each vane 73 carries three water-displacement rods 57 and one labelled 57a with their centers spaced equally along vane 73 between the center of the sleeve 71 and the center of the end rod 57. The rod 57a just inwardly of the end rod is centered at the intersection of the cross vane 77 and the vane 73. In addition, the cross vane 77 typically carries a pair of rods 57b at its ends. The spacing between the centers of the rods 57a and 57b on each side is typically equal to the spacing between the centers of the rods 57, 57a along the vane 73. The rods 57c and 57d on each vane 75 are in a crucifix configuration. There are rods 57c along each vane 75, one at the end of the vane and another inwardly. The centers of rods 57c are typically spaced equally from the center of the intersection of each vane 75 and each cross vane 79. The cross vane 79 typically carries rods 57d at its ends. The spacing of the centers of rods 57d from the center of the intersection of the cross vane 79 and the vane 75 is equal to the corresponding spacing for rods 57b. The centers of rods 57c and 57d thus define the corners of a square.

Figure 11:
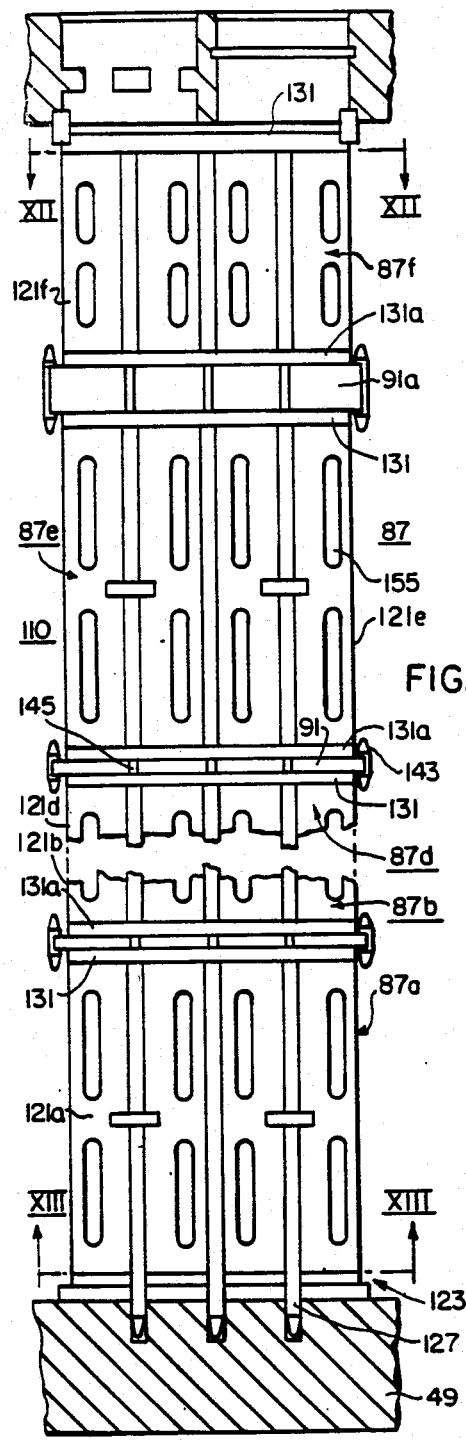
FIG. 11 is a view in side elevation of an integrated unit including square plate sections and columnar guide sections to which the plate sections are secured.

The reactor 31 has upper internals 81 (FIG. 1) including guide means for the neutron-absorber rod clusters 51 and 55. The guide means includes columnar guides of cruciform transverse cross-section for the control-rod and gray-rod clusters 51 and plates 85 for the water-displacement-rod clusters 55. Each columnar guide is formed of a plurality of coextensive vertical columnar sections generally labelled 87 to, or between, which the plates 85 are secured. In the interest of facilitating the description of this invention, these sections are designated 87a, 87b, 87c, 87d, 87e, 87f (see FIG. 1 and particularly FIG. 11). The plates 85 are generally horizontal. A plurality of plates 85 are arranged vertically, together serving as guides for the WDRC's.

Figure 6:
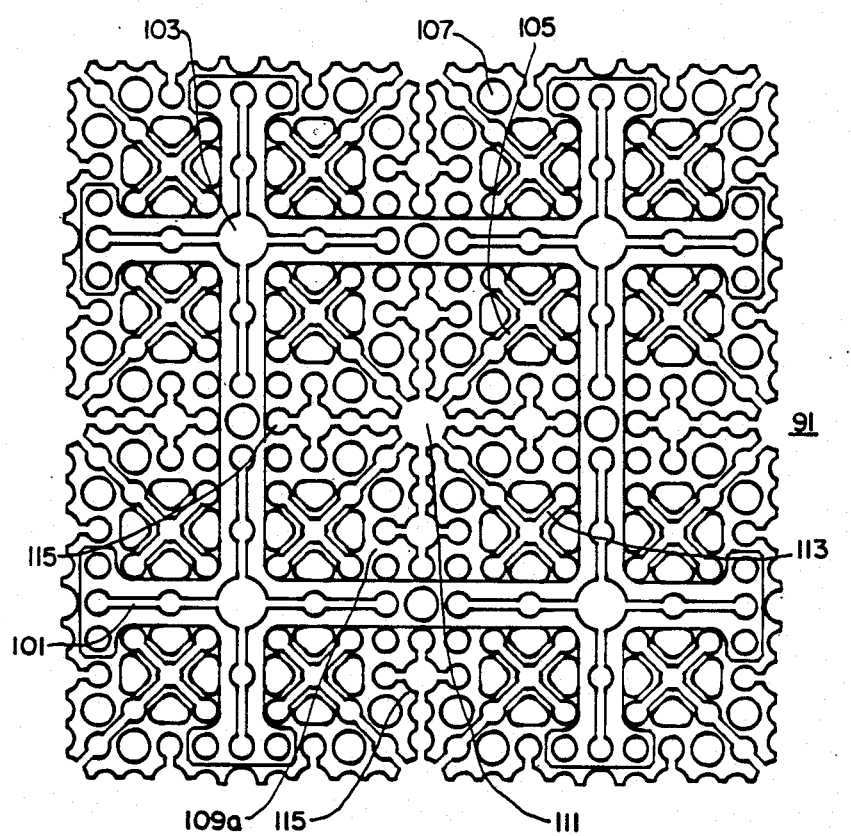
FIG. 6 is a plan view of a square plate section which forms a part of a plate guide.
Figure 7:
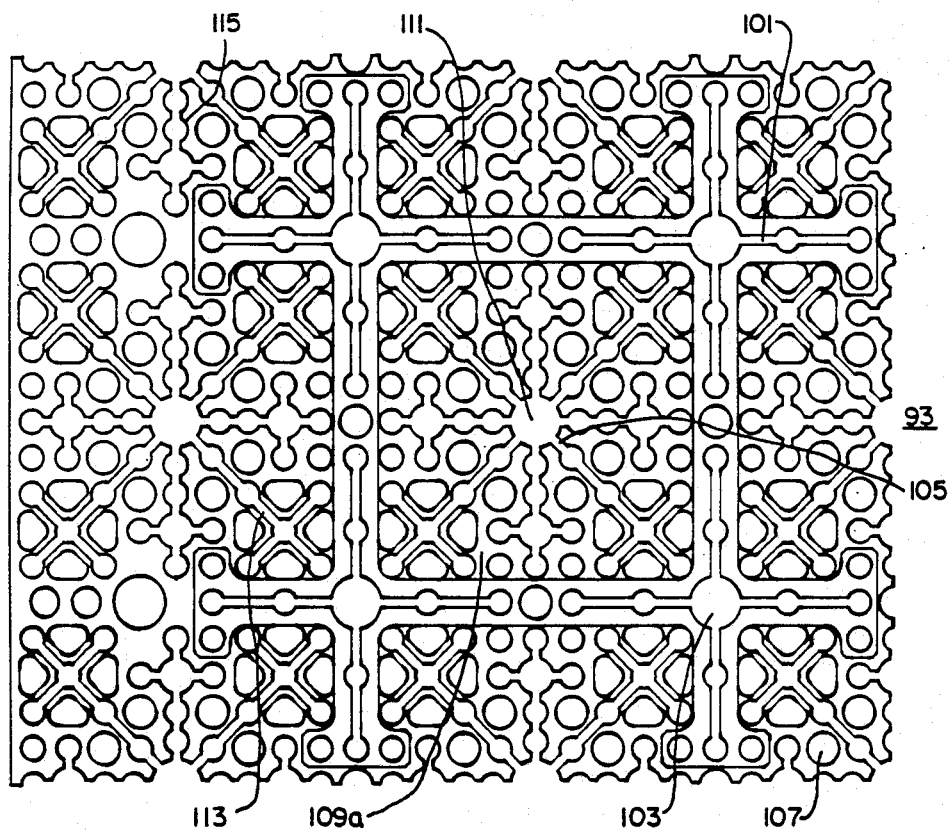
FIG. 7 is a plan view of a rectangular plate section which also forms a part of the plate guide.
Figure 8:
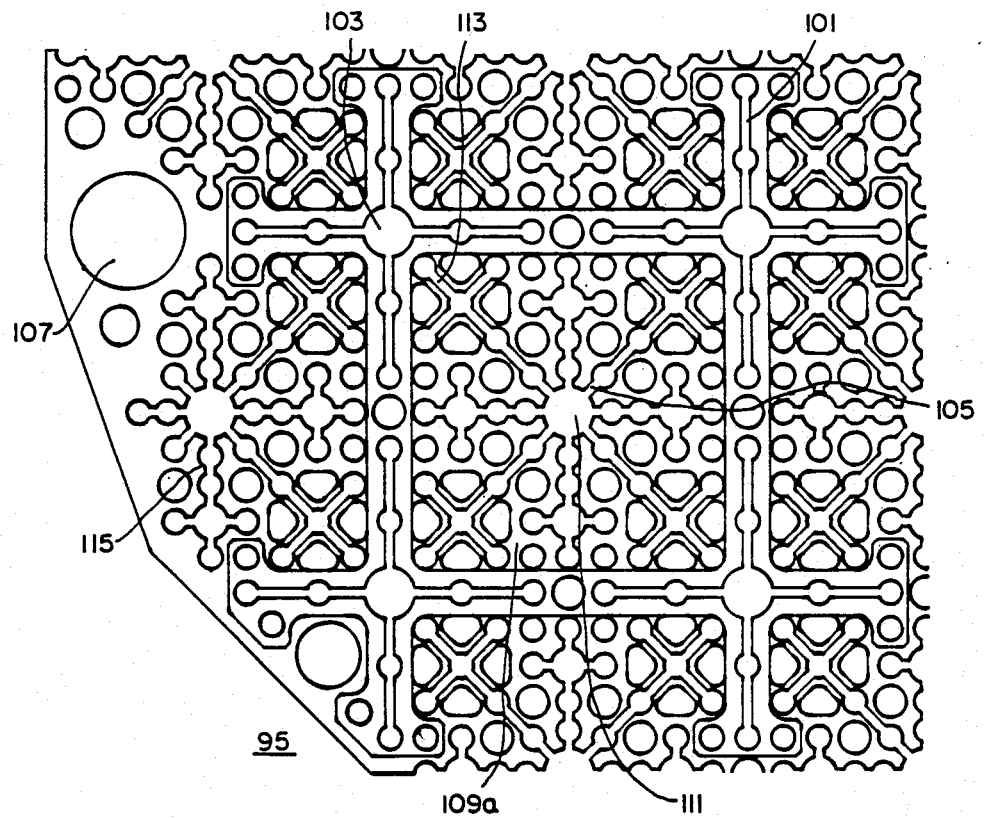
FIG. 8 is a plan view of a trapezoidal plate section which also forms a part of the plate guide along the periphery.
Figure 9:
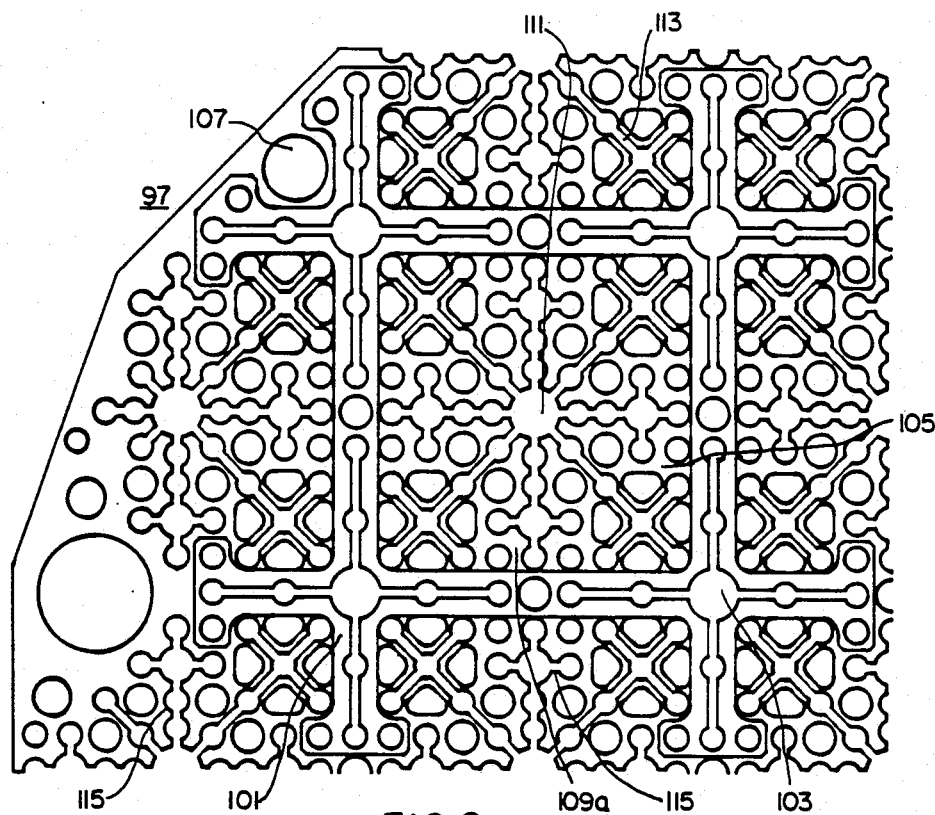
FIG. 9 is a plan view of another trapezoidal plate section which forms a part of a plate guide at a position opposite to that of the plate section shown in FIG. 8.
Figure 10:
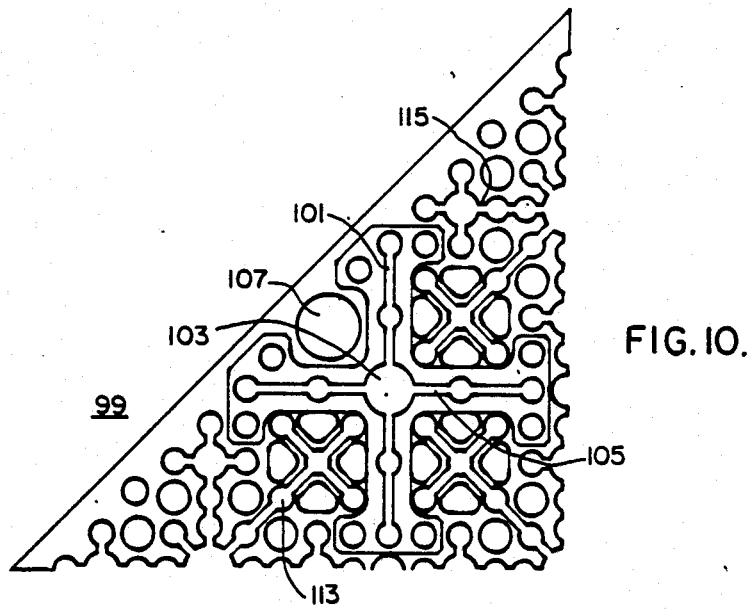
FIG. 10 is a plan view of a triangular plate section which forms a part of the plate guide.

In the interest of precluding the necessity of providing an excessively thick plate 85 and facilitating the handling of the plate guides during installation and maintenance, each plate 85 is formed of a plurality of plate sections nested together in the manner of a "jigsaw puzzle". The different sections are shown nested in FIG. 5. There are five basic plate sections: a square section 91 (FIG. 6); a rectangular section 93 (FIG. 7); i.e., with adjacent sides of unequal length; a lower trapezoidal section 95 (FIG. 8) as viewed in FIG. 5, the left trapezoidal section 97 (FIG. 9) as viewed in FIG. 5, and a triangular section 99.

Figure 3:
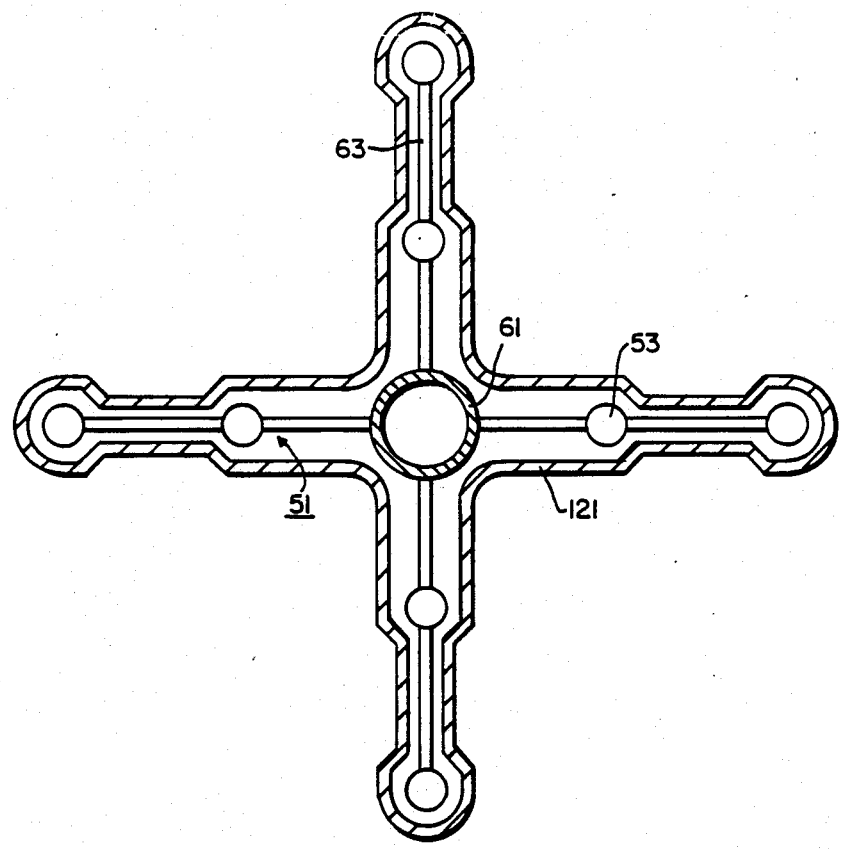
FIG. 3 is a view in transverse section of a control-rod or gray-rod cluster and guide with the rods not sectioned.
Figure 4:
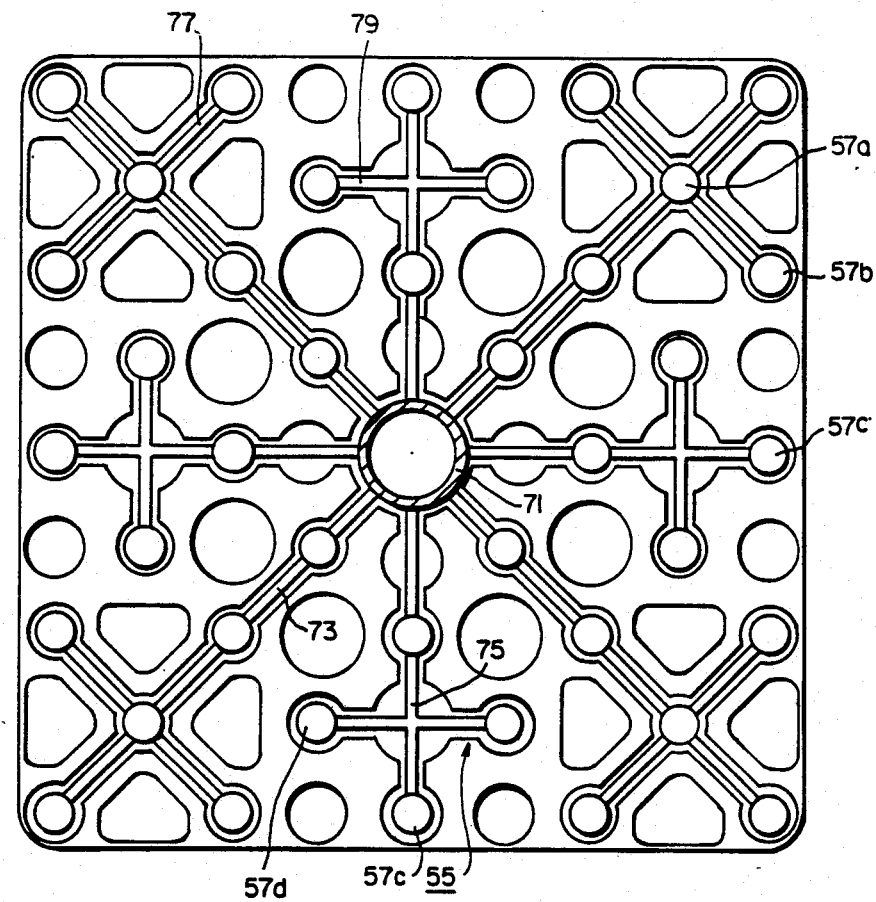
FIG. 4 is a plan view of a water-displacement-rod cluster with the center post in transverse section.
Figure 5:
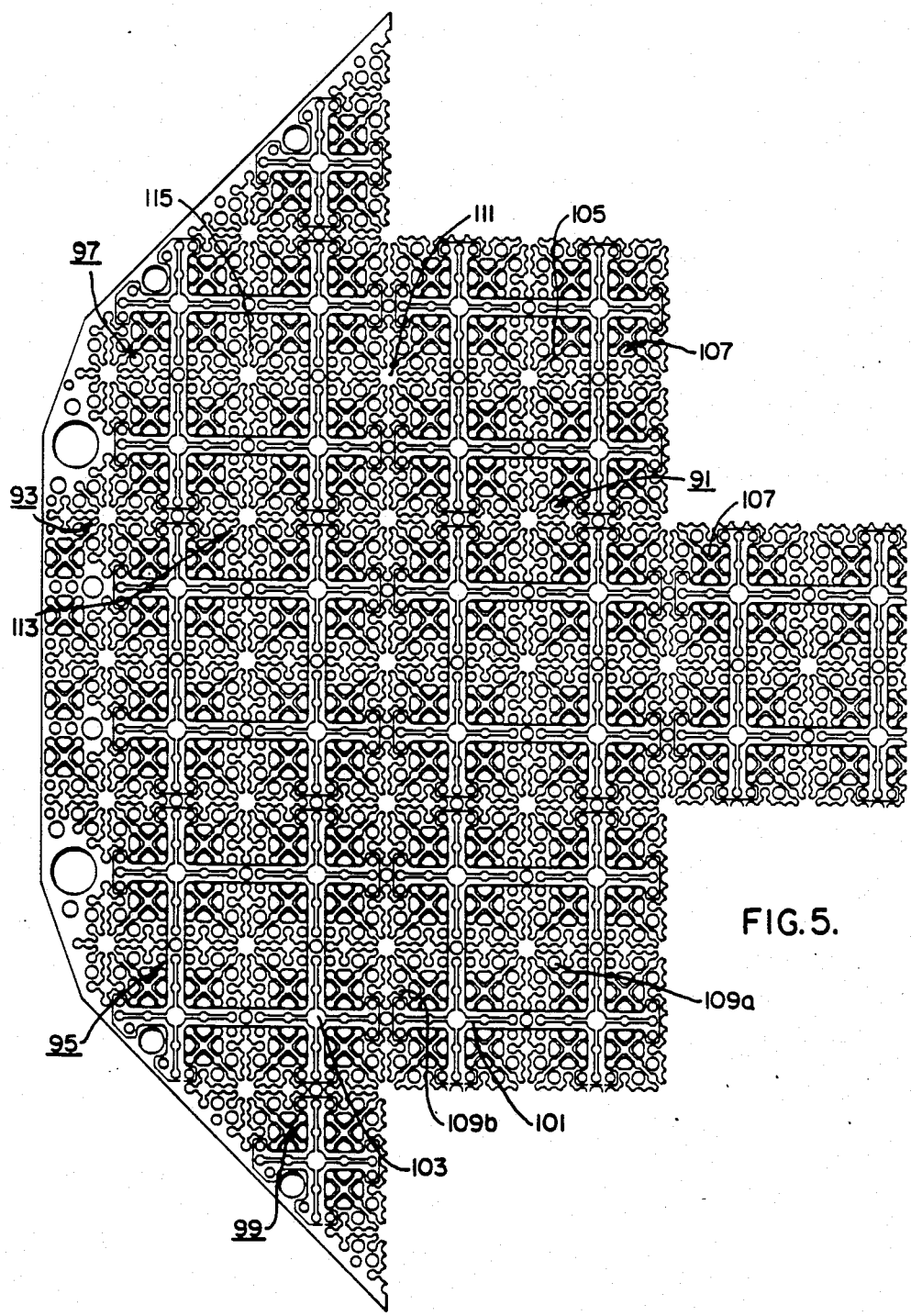
FIG. 5 is a fragmental plan view showing the nesting of the different plate sections which form the plate guides in accordance with this invention.

The plate sections are perforated to pass and guide the control-rod and gray-rod clusters 51 between their guide sections 87 and the WDRC's 55 and also to pass the coolant. Perforations 101 of cruciform configuration are distributed uniformly throughout each plate 85. Except at the periphery of the plate, each four of these perforations 101 define the corners of a square. The perforations 101 are included as a whole in each of the sections 91–99. These cruciform perforations 101 pass the control-rod or gray-rod clusters 51. The hole 103 in the center of each perforation 101 passes the sleeve 61 (FIG. 3). The plate 85 also includes perforations 105 and 107 in uniformly-distributed square patterns 109a and 109b. The corners of these square patterns extend into the quadrants defined between the arms of the cruciform perforations. Some of these square patterns 109a are included wholly in the plate sections 91–97, others 109b are formed by the nesting of adjacent sections. For example, the pattern designated by the number 109b in the lower part of FIG. 5 is formed by the nesting of the rectangular section 93 in the lower right-hand corner and the trapezoidal section 99. Each perforation 105 includes a central circular opening 111 dimensioned to pass the stem 71 (FIG. 4) of the WDRC. Perforations 113 and 115 radiate from the periphery of opening 111. Perforations 113 are shaped and dimensioned to pass the vanes 73 and 77 of a WDRC and its associated rods 57, 57a, 57b and perforations 115 are shaped and dimensioned to pass the vanes 75 and 79 of a WDRC and their associated rods 53, 53c, 53d. Holes 107 serve to pass the coolant.

FIGS. 11 through 19 show the manner in which the columnar guide sections 87 and the separate plate sections 91 through 99 are assembled into integrated guide units. Specifically, FIGS. 11 through 19 disclose the assembly of square plate sections 91 with columnar section 87a through 87f into an integrated unit 110. The other plate sections 93 through 99 are also integrated with columnar guide sections. Their integration will be understood from the following description as to the integration of the square plate sections 91 with sections 87.

Figure 13:
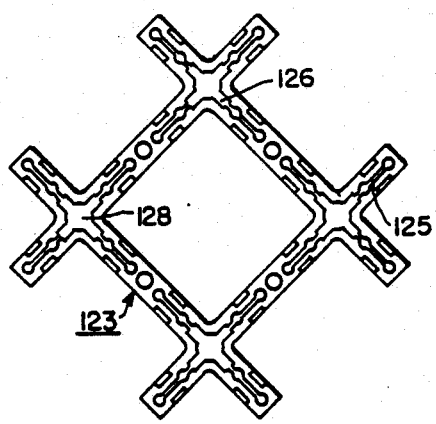
FIG. 13 is a plan view taken in the direction XIII—XIII of FIG. 11 showing the bottom end plate of the unit.
Figure 12:
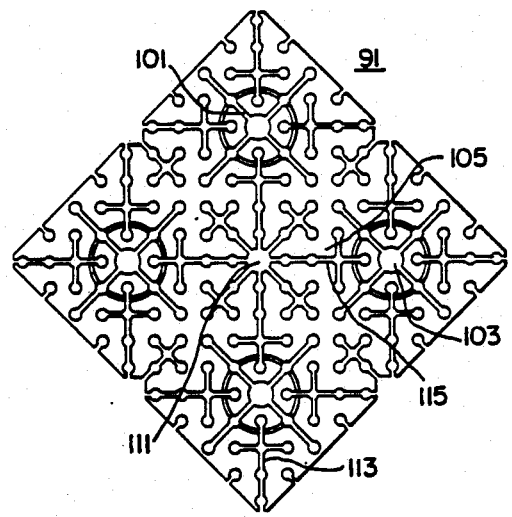
FIG. 12 is a plan view taken in the direction XII—XII of FIG. 11 showing the top of the integrated unit.
Figure 18:
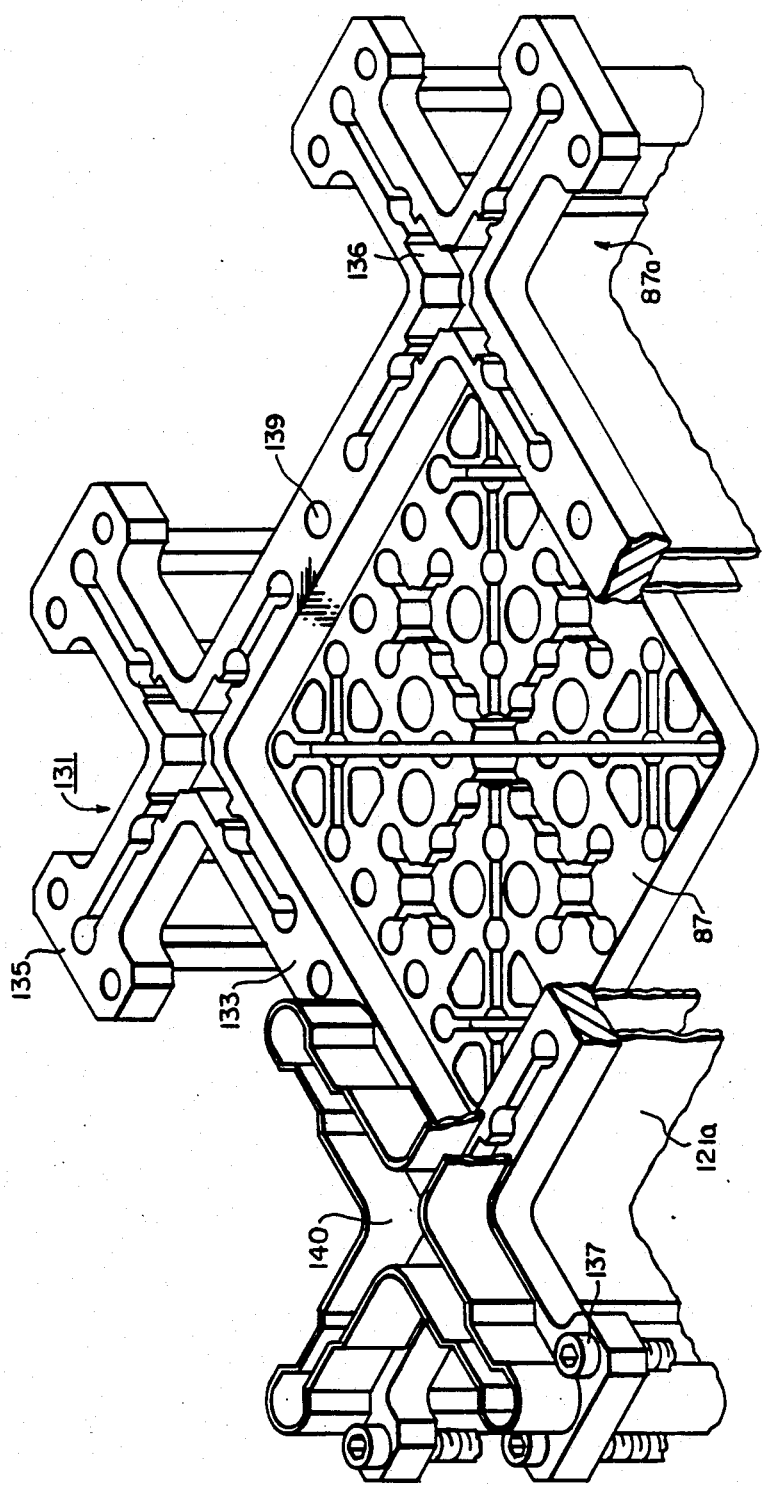
FIG. 18 is a fragmental view in isometric showing a portion of the integrated unit shown in FIG. 11.

In the unit 110, each section 87a through 87f includes a plurality (five in the specific case shown) of open-ended enclosures or cans 121a through 121f, designated generally 121 (FIG. 3). Each can has a cruciform transverse cross-section with openings dimensioned the same as the cruciform perforations 101 (FIGS. 5-8). At its lower end, each can 121a is welded to a frame-like open-end plate 123 whose boundaries are intersecting parallel strips 125 (FIG. 13). Extending through the strips symmetrically on both sides of each intersection are cruciform perforations 126 (FIGS. 13, 14) congruent with the perforations 101. Each of these cruciform perforations 126 is centered or symmetrical about an axis 128 through the center of the intersections of the strips 125. These axes 128 define the corners of a square. The cans 121a are welded so that each can envelops a cruciform perforation 126 at an intersection of strips 125 and is also centered on the corresponding axis 128. The end plate 123 is aligned by pins 127 which engage the upper core plate 49 (FIG. 1) thus holding the lower end of the columnar guide formed of the columnar sections 87a through 87f in lateral alignment. When the rods are inserted in the core 43, the vanes 63, 73, 75, 77 and 79 are advanced to the end plate 123. The control rods and gray rods 53 pass through holes 130 (FIG. 17) and the water-displacement rods through holes 132 (FIG. 16) in the core plate 49. Holes 134 pass the coolant. Only two rows of holes 130, 132 and 134 are shown in FIG. 14; these are representative of holes which extend throughout the core plate 49.

The upper ends of the can 121a are welded to an end plate 131. An end plate 131 is shown enlarged in FIG. 18. This end plate 131 is also composed of intersecting strips 133, each strip having a flanges 135 at its ends. The strips 133 have perforations 136 which are congruent with the perforations 101. The upper end of each can 121a encompasses these perforations and is centered on the axis of the perforations defined by the center point 140 of intersection of strips 133. The lower and upper end of can 121b (FIGS. 1, 11) is similarly welded to a lower end plate 131a (FIG. 11) spaced a short distance from the end plate 131, to which can 121a is welded, and an upper end plate (not shown for 121b). The lower end plate 131a and the one not shown are identical to plate 131.

Likewise, cans 121c, 121d, and 121e are welded between end plates 131 (not shown for 121c) at the bottom and end plate 131 at the top. A square plate section 91 is secured between each pair of end plates 131 and 131a to which respectively an upper end of a lower guide section 121, for example 121c, and a lower end of an adjacent upper guide section, for example 121d, are welded. The perforations 101 (FIG. 6) in each of the plate sections 91 are precisely aligned with the perforations 136 in the end plates 131 which abut each plate section. The strips 133 which form the end plates 131 and 131a extend only along the unperforated frames bounding the squares 109a and 109b so that they do not obstruct the movement of the control rod and gray rod clusters and the WDRC's. The plate section 91 and the end plates 131 and 131a are in each case secured together by two screws 137 (FIG. 18) through each flange 135, spaced symmetrically about the center line of the strip 133, and shoulder bolts 139 (FIG. 21) threaded into the centers of each of the strips.

Figure 19:
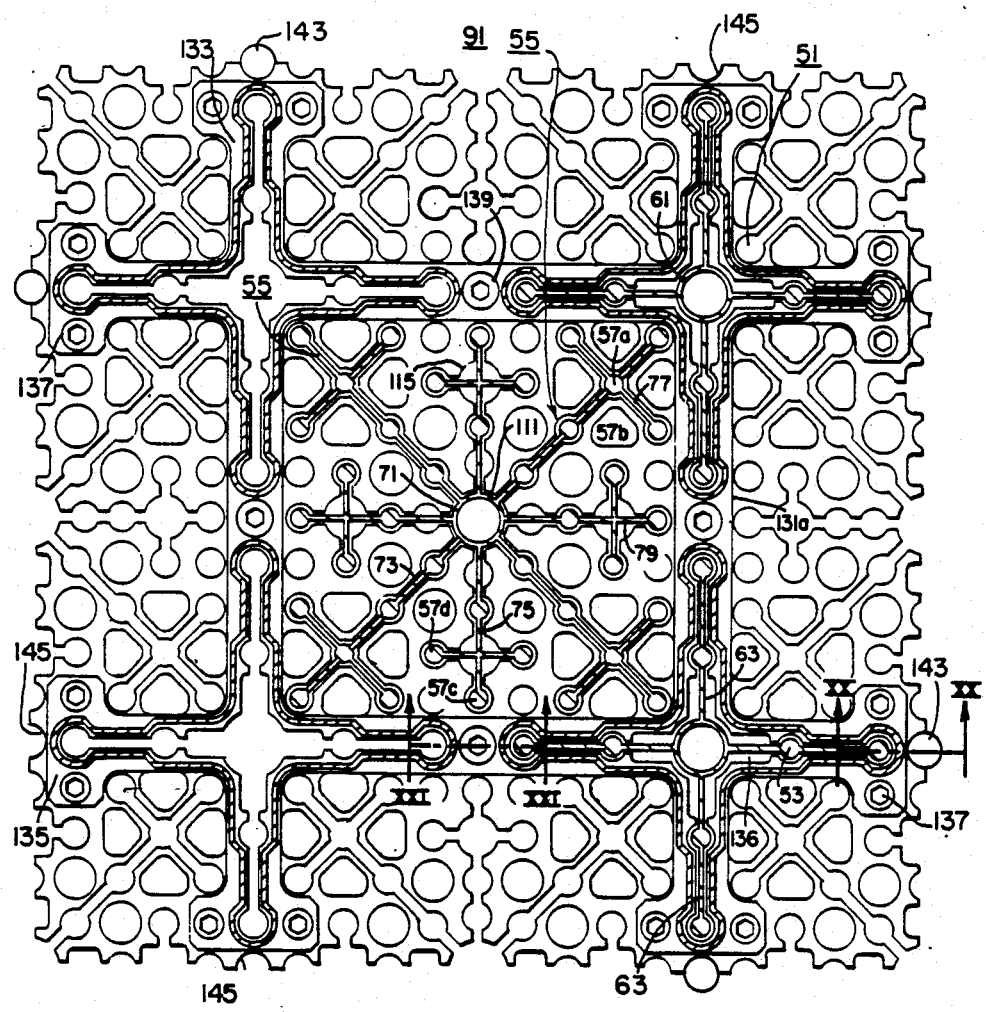
FIG. 19 is a plan view enlarged showing one of the plate sections and an associated end plate which forms a part of the integrated unit shown in FIG. 11 and also showing a complete unit of neutron-absorbent rod clusters including 4 control-rod or gray-rod clusters and an associated WDRC.

The upper ends of cans 121e are welded to end plates 131 and the lower and upper ends of cans 121f are welded to end plates 131a and 131. Between end plates 131 and 131a, at the upper end of each can 121e and the lower end of each can 121f, there is secured a plate section 91a substantially thicker than the other square plate sections 91, but having the same perforations. This thickened plate section 91a may be described as the parking plate section. It is the plate section in which the vanes (spiders) of the associated control-rod and gray-rod clusters 51 (FIGS. 3, 19) and WDRC's 55 (FIGS. 4, 19) are housed or parked when these clusters are in their uppermost position with the rods removed from the core 43. The upper ends of cans 121f are welded to top plate section 141 which is shown in plan view in FIG. 12. The top plate section 141 is perforated similarly to the plate sections 91 and 91a to permit insertion into each integrated unit of a columnar guide column and plate guides of the clusters 51 and 55 with their vanes 63, 73, 75, 77, 79 (FIG. 19).

On each of its sides, each plate section 91 and 91a is provided with at least one pin 143 inserted in a semi-circular slot (FIGS. 19, 20) and at least one semicircular slot 145. The function of the pins 143 and the slots 145 is to align the integrated unit 110 with contiguous integrated units of columnar guides and plate sections. The pins and slots are staggered along the sides of the plate sections 91 and 91a. The pins 143 engage slots in the contiguous plate sections and the slots 145 engage pins in the contiguous plate sections.

In the integrated units 110 including the columnar guide and the plate sections 91 and 91a, the guide sections 121a through 121f are precisely aligned and the perforations in the plate sections 91 and 91a are precisely aligned so that the rod clusters can be moved through the cruciform guide columns and through the perforations without binding.

Integrated units of the other plate sections 93 through 99 integrated with columnar guide sections 121a through 121f similarly to the integrated unit 110 are also provided. These units are not shown, but they are similar to the units 110 and their structure can be understood from the above description of the unit 110. Like unit 110, each of the units formed of sections 93 through 97 includes a plurality of sets, typically of four each, of housings of cruciform transverse cross-section. The lowermost housing of each set is welded at its lower end to an end plate 123 and at its upper end to an end plate 131. The other housings of each set are each welded at its lower end to end plate 131a and at its upper end to end plate 131. In the case of the triangular plate section 99, there is only one housing of cruciform section. The plate sections are interposed and secured between the end plates 131 and 131a. The uppermost plate section in each case, which serves to house the spiders 63, 73, 75, 77, 79 (FIGS. 3, 4, 19) in the retracted position, is thicker than the other sections.

The integrated unit 110 and the other integrated units are fabricated externally to the reactor. Each integrated unit is inserted in the reactor vessel 33. The pins 127 (FIGS. 11, 15) extending from the end plates 123 engage holes in the upper core support 49 thus aligning each unit laterally. Pins such as the pins 143 in each integrated unit engage slots such as slot 145 in the contiguous units and slots in each integrated unit engage pins in contiguous units. The integrated units are thus aligned into the complete guide assembly in upper internals 81.

The upper internals include a flow-through screen 151 (FIGS. 1, 2) which is centered within the vessel 33 on the upper core support 49. For proper positioning, the flow-through screen 151 is provided with a skirt 149. After the integrated units are formed into an assembly, the assembly is centered within the flow-through screen 151. The upper-internals top plate 147 (FIG. 1) is then mounted on the top of the assembly. The flow-through screen 151 extends from the top plate 147. Formers 153 extend at each level of the plate 85. All cruciform cans have slots 155 (FIG. 11) to facilitate lateral flow of coolant. The flow-through screen 151 distributes the outflowing coolant over the whole volume encompassed by the screen and precludes concentrated flow directly through the nozzles 40. Such flow would be at a very high velocity because the space through which it is conducted is limited and failure of control and water-displacement rods would result.

The plate guide assembly 85 is made up typically of nine square-shaped integrated units 130, four rectangular-shaped units, four right trapezoidal-shaped units, four left trapezoidal-shaped units and four triangular-shaped units. The total number of units required for the guide assembly is therefore only twenty-five. The integrated units are readily fabricated at relatively low cost. The integrated guide units are held in position by the pins 127, and 143 and by a vertical spring-loaded package (not shown) located in the upper-internals top plate 147. The control rod and gray-rod clusters 51 can be removed and inspected through openings (not known) in the top plate 147. The WDRC's can be removed and inspected by disassembly of the top plate 147.

The guide plates are subdivided into areas. These areas define columnar volumes bounded by the arms of cans 121 except along the periphery of each plate where the columnar volumes are defined by the arms of less than 4 cans. These arms limit the flow of coolant through water-displacement rods when these rods are retracted.

While a preferred embodiment of this invention has been disclosed herein, many modifications thereof are feasible. This invention is not to be restricted except insofar as is necessitated by the spirit of the prior art.

I claim:

1. A nuclear reactor including a core having a plurality of fuel assemblies, upper internals, and neutron-flux adjusting rods and means for moving said neutron-flux adjusting rods between said fuel assemblies and said upper internals, said upper internals including guide means for guiding said neutron-flux adjusting rods, said guide means including a plurality of columnar guides for guiding certain of said neutron-flux adjusting rods, each said columnar guide of said plurality including a plurality of coextensive generally vertical guide sections aligned to receive said certain neutron-flux adjusting rods, said guide means also including a plurality of generally horizontal plate sections connected to said guide sections and positioned generally vertically along said upper internals, each said plate section being nested in the manner of a "jig-saw" puzzle and being secured to, adjacent plate sections at the generally vertical level of said each plate section to form an integrated composite plate at each said level extending laterally substantially throughout the upper internals, each said plate section having perforations patterned to pass others of said neutron-flux adjusting rods, said plate sections being oriented each at its generally vertical level with their perforations for said others of said neutron-flux adjusting rods aligned so that said composite plates serve as guides for said others of said neutron-flux adjusting rods.

2. The nuclear reactor of claim 1 wherein the certain neutron-flux adjusting rods include control rods, and gray rods, and the other neutron-flux adjusting rods include only water-displacement rods, said certain neutron-flux adjusting rods being guided by the columnar guides each of which is formed of a plurality of aligned generally vertical guide sections, and said other neutron-flux adjusting rods being guided by the integrated composite plates.

3. The nuclear reactor of claim 1 wherein the neutron-flux adjusting rods are mounted in clusters on cruciform suspensions, and the generally vertical columnar guide sections are enclosures of cruciform cross-sections dimensioned to guide the clusters of the certain of the rods, and the perforations in the plates are generally radial slots dimensioned and aligned to guide the clusters of other of the rods.

4. The nuclear reactor of claim 1 wherein the plate sections are of different shape and each integrated composite plate is formed by nesting in the manner of a "jig-saw puzzle" a plurality of said plate sections of different shapes, certain of said plate sections of different shape forming the periphery of each said composite plate and each of said certain plate sections having a contour corresponding to a part of the periphery of said composite plate and the remainder of said plate sections forming the interior of each composite plate and having a shape to nest with said certain plate sections which form said periphery and with each other, each of said plate sections forming an integral unit with one or more guide sections and being secured to the said one or more guide sections.

5. The nuclear reactor of claim 4 wherein the certain plate sections which form the periphery of the composite plate have respectively triangular shape, trapezoidal shape, and rectangular shape with adjacent sides of different length and the remaining plate sections which form the interior of the plate have a square shape.

6. The nuclear reactor of claim 5 wherein the guide means includes sets of generally vertically aligned plate sections, each said set in vertical alignment including a plurality of the plate sections of the same shape, each said set forming a generally vertical unit with associated columnar guide sections, each plate section of a said set being secured to a guide section or between sequential of said guide sections in said unit.

7. The nuclear reactor of claim 6 wherein the plate sections are of triangular shape and each set of said triangular plate sections form a generally vertical unit with a set of single columnar guide sections in a vertical array, said triangular plate sections being secured centrally to a guide section or between sequential guide sections in said array.

8. The nuclear reactor of claim 6 wherein each of the plate sections is of other than triangular shape and each set of said plate sections of other than triangular shape forms a generally vertical unit with a plurality of sets, each set composed of a plurality each of columnar guide sections, the guide sections of each set being at the same level, corresponding guide sections of said sets of guide sections being aligned in a generally vertical columnar array, said plate sections of other than triangular shape being secured at spaced regions to a guide section or between a plurality of sequential guide sections in said aligned array.

9. The nuclear reactor of claim 8 wherein the plurality of columnar guide sections are secured to the other than triangular plate section symmetrically with respect to a central axis of said other than triangular plate sections generally perpendicular to said other than triangular plate section.

10. The nuclear reactor of claim 1 wherein the upper internals includes a flow-through screen for reducing the radial velocity of the coolant and means mounting said flow-through screen so that it encircles the guide means whereby the radial velocity of the coolant flowing through the guide means is reduced and cross-flow drag forces of the coolant on retracted water-displacement rods in the regions between the composite plates is low.

11. The nuclear reactor of claim 1 wherein each of the guide sections of each columnar guide of the plurality of columnar guides has a generally cruciform transverse cross-section and the guide sections are positioned with respect to the plate sections so that the arms of the cruciform configuration of a plurality of guide sections at each level bounds the columnar volume under an area of plate sections to which the guide section is secured near said area, whereby the cross flow of coolant over retracted water-displacement rods in said columnar volume is limited.

12. The nuclear reactor of claim 1 wherein the plate sections are of different shapes and the guide means is formed of sets of vertically aligned units, each unit including a plurality of vertical columnar guide sections, at least one guide section at each level, the said at-least-one guide sections at the different levels being vertically aligned, the said guide section at each level supporting a plate section, the plate sections at the different levels being of the same shape and being vertically aligned.

13. For use as part of a nuclear reactor having a large number of neutron-flux adjusting rods and having guide means for guiding said neutron-flux adjusting rods including a plurality of columnar guides for guiding certain of said neutron-flux adjusting rods, each said columnar guide including a plurality of hollow guide sections and said guide means also having plate sections supported by said guide sections serving as guides for others of said neutron-flux adjusting rods, each said plate being formed of a plurality of plate sections of different shapes nested together in the manner of a "jig-saw puzzle", a structural unit including a set of a plurality of plate sections of the same shape and a plurality of hollow guide sections, said guide sections of said plurality being aligned and each plate section of said set being secured to or between adjacent guide sections, the area of each plate section of said plurality bounded by the edges of the guide section to which, or the guide sections between which, said each plate section is secured being perforated and the said perforations of the said plate sections being aligned and being shaped to pass said certain neutron-flux adjusting rods so that each said certain neutron-flux adjusting rod may be passed through the aligned guide sections substantially throughout their combined length.

14. A nuclear reactor including a core having a plurality of fuel assemblies, a plenum above said core, neutron-flux adjusting rods, and means, connected to said neutron-flux adjusting rods, for moving said neutron-flux adjusting rods between said plenum and said core, the said reactor also including guide means for said neutron-flux adjusting rods within said plenum, said guide means including a plurality of generally vertical columnar guides for guiding certain of said neutron-flux adjusting rods, each said columnar guide including a set of coextensive columnar guide sections, the guide sections of each set being arrayed in a generally vertical array, the said guide means also including a plurality of generally horizontal plate sections connected to said guide sections of each said set, said plate sections being spaced generally vertically along said plenum, plate sections connected to corresponding guide sections of different sets being positioned at the same vertical level and being nested with adjacent plate sections at said same nested level in the number of a "jig-saw" puzzle to form an integrated composite plate at said level, said composite plate extending substantially throughout said plenum, each said plate section having perforations patterned to pass others of said neutron-flux adjusting rods, said plate sections being oriented, each at its vertical level with the perforations for said others of said neutron-flux adjusting rods aligned so that said composite plates serve as guides for said others of said neutron-flux adjusting rods.

* * * * *